(12) United States Patent
Trojanowski

(10) Patent No.: US 8,132,248 B2
(45) Date of Patent: Mar. 6, 2012

(54) MANAGING CONFIGURATIONS OF A FIREWALL

(75) Inventor: Bart Trojanowski, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 877 days.

(21) Appl. No.: 12/139,492

(22) Filed: Jun. 15, 2008

(65) Prior Publication Data

US 2009/0025077 A1 Jan. 22, 2009

Related U.S. Application Data

(60) Provisional application No. 60/950,601, filed on Jul. 18, 2007.

(51) Int. Cl.
*G06F 9/00* (2006.01)

(52) U.S. Cl. .............. 726/11; 726/12; 705/79; 713/153; 713/154; 709/238; 370/351

(58) Field of Classification Search .............. 726/11, 726/12; 705/79; 713/153, 154
See application file for complete search history.

(56) References Cited

U.S. PATENT DOCUMENTS

| | | | | |
|---|---|---|---|---|
| 5,632,011 A * | 5/1997 | Landfield et al. | ............. | 709/206 |
| 6,970,462 B1 * | 11/2005 | McRae | ............. | 370/392 |
| 7,089,586 B2 * | 8/2006 | Kilgore | ............. | 726/13 |
| 7,227,842 B1 * | 6/2007 | Ji et al. | ............. | 370/235 |
| 7,246,156 B2 * | 7/2007 | Ginter et al. | ............. | 709/217 |
| 7,382,777 B2 * | 6/2008 | Irish et al. | ............. | 370/392 |
| 7,480,299 B2 * | 1/2009 | O'Keeffe et al. | ............. | 370/392 |
| 7,779,119 B2 * | 8/2010 | Ginter et al. | ............. | 709/224 |
| 7,840,696 B2 * | 11/2010 | Horgan | ............. | 709/236 |
| 7,913,289 B2 * | 3/2011 | Chen et al. | ............. | 726/1 |
| 2002/0166068 A1 * | 11/2002 | Kilgore | ............. | 713/201 |
| 2004/0151135 A1 * | 8/2004 | Kitahama et al. | ............. | 370/328 |
| 2005/0015624 A1 * | 1/2005 | Ginter et al. | ............. | 713/201 |
| 2005/0182969 A1 * | 8/2005 | Ginter et al. | ............. | 713/201 |
| 2005/0204159 A1 * | 9/2005 | Davis et al. | ............. | 713/201 |
| 2006/0206608 A1 * | 9/2006 | Naito et al. | ............. | 709/224 |
| 2006/0242109 A1 * | 10/2006 | Pereira et al. | ............. | 707/1 |
| 2006/0272013 A1 * | 11/2006 | Kilgore | ............. | 726/11 |
| 2007/0118893 A1 * | 5/2007 | Crawford | ............. | 726/11 |
| 2007/0136813 A1 * | 6/2007 | Wong | ............. | 726/25 |
| 2007/0294369 A1 * | 12/2007 | Ginter et al. | ............. | 709/217 |
| 2008/0107068 A1 * | 5/2008 | Kitahama et al. | ............. | 370/328 |
| 2008/0148384 A1 * | 6/2008 | Adhikari et al. | ............. | 726/13 |
| 2008/0282336 A1 * | 11/2008 | Diaz Cuellar et al. | ............. | 726/11 |
| 2010/0180331 A1 * | 7/2010 | Murakami et al. | ............. | 726/11 |

* cited by examiner

*Primary Examiner* — April Shan
(74) *Attorney, Agent, or Firm* — Victoria Donnelly; IP-MEX Inc.

(57) ABSTRACT

A method and system for managing multiple firewall configurations are disclosed. The method uses a pointer on a packet object representing a packet to reference a configuration object representing a configuration of the firewall which is assigned to the packet. By using a pointer to link each packet entering a computer system to the most recent configuration, the method can maintain multiple configurations and enable the firewall processing modules to process each packet according to its assigned configuration even if new configurations are released during the transition of the packet through the system. A reference count is also used as a variable by the configuration object to track the number of packets assigned to the configuration. A corresponding system is also provided.

20 Claims, 7 Drawing Sheets

MANAGING CONFIGURATIONS OF A FIREWALL

RELATED APPLICATIONS

The present invention claims benefit from the U.S. provisional application 60/950,601 to Trojanowski, Bart filed on Jul. 18, 2007 entitled "Managing Configurations of a Firewall", which is incorporated herein by reference.

FIELD OF INVENTION

The present invention relates to intrusion prevention detection systems comprising firewalls, and in particular, to managing configurations of a firewall.

BACKGROUND OF THE INVENTION

Host intrusion prevention system (HIPS) prevents malicious behavior from occurring on a host (server or desktop computer). Unlike Network intrusion prevention system (NIPS), the solutions are software-based, and the software is deployed on the host itself, closest to the applications and data that need to be protected.

A packet can exist in a deep inspection firewall of the HIPS for a long time, because analysis often requires multiple packets to commence. While the HIPS waits for the next packet to arrive, it is possible that the configuration of the firewall is changed.

Multiple configurations may be incompatible, and thus cause an undesirable outcome, like letting undesired packets through.

Accordingly, there is a need in the industry for developing a method and system for ensuring that packets are correctly processed in the HIPS in case of firewall configuration changes.

SUMMARY OF THE INVENTION

There is an object of the invention to provide a method and system for managing multiple configurations of the firewall, including associating multiple configurations of the firewall with packets processed in the HIPS.

In the embodiment of the present invention, the firewall may keep multiple configurations. When a packet enters the system for the first time, it is associated with the most recent configuration and remains this way until it exits the system even if the configuration changes during the transition of the packet through the system. Each time the processing of the packet requires a configuration parameter the one associated with the packet is checked. Multiple packets use the same configuration object. Older configurations that are no longer associated with packets are discarded.

According to one aspect of the invention, there is provided a method for managing firewall configurations at a computer, comprising the steps of: providing a first configuration object representing a configuration of the firewall; the first configuration object having a reference count; setting the first configuration object as a current configuration by initializing the reference count to a current-value reference count; generating a packet object representing a packet received at the computer; assigning said packet object to said first configuration object and, incrementing said reference count upon assigning said packet object to said first configuration object; and processing said packet object by a plurality of firewall processing modules according to said first configuration object.

Beneficially, the first configuration object is stored in a configuration database. In a further benefice, the current-value reference count is equal to one.

In one modification, the method further comprises decrementing the reference count of said first configuration object when the processing of said packet object by said plurality of processing modules is complete.

In another modification, the method further comprises generating a second configuration object and initializing a reference count of said second configuration object to the current-value reference count; and decrementing the reference count of said first configuration object once the reference count of said second configuration object is initialized.

In yet another modification, the method further comprises deleting said first configuration object from said configuration database if the reference count of said first configuration object is decremented to zero.

Advantageously, the method further comprises providing a configuration object pointer on said packet object for referencing said first configuration object.

Alternatively, the method may comprise providing at least 2 pointers on said packet object for referencing a data section and a header section of said packet received at the computer.

Additionally, the firewall configuration is represented as a configuration binary blob.

Conveniently, the first configuration object includes a pointer to said configuration binary blob.

According to another aspect of the present invention a method for managing configurations of a firewall at a computer is disclosed. The method comprises providing a current configuration object representing a first firewall configuration and a previous configuration object representing a second firewall configuration in a configuration database at a host security agent and each having a pointer to a respective configuration binary structure; representing a first packet received at the computer with a first packet object comprising assigning said first packet object to said previous configuration object; representing a second packet received at the computer with a second packet object comprising assigning said second packet object to said current configuration object; and processing the first packet object and the second packet object by a plurality of firewall processing modules based on their assigned respective configuration object.

Additionally, the method further comprises deleting said previous configuration object from a configuration database when no more packet object assigned to said previous configuration object is present in the firewall processing modules.

Advantageously, the method further comprises providing a first configuration object pointer on said first packet object for referencing said previous configuration object and providing a second configuration object pointer on said second packet object for referencing said current configuration object.

According to another aspect of the present invention, a system for managing multiple firewall configurations at a computer is disclosed. The system comprises: an agent application module for compiling configuration data into a binary structure configuration data and for generating configuration objects; a filter module comprising: a configuration database for hosting said configuration objects; a platform-specific code module for generating packets objects representing packets received in the computer and for assigning each of said packets objects to one of said configuration objects; and a plurality of firewall processing modules for processing said packets according to their respectively assigned configuration objects.

Beneficially, each of said configuration objects include a reference count initialized to a current-value reference count and used to track a number of packets objects assigned to said corresponding configuration object.

Advantageously, each of said packet objects includes a configuration object pointer for referencing said one of said configuration objects.

Conveniently, each of said packet objects includes elements selected from the group consisting of: an Access flag, an Ethernet header pointer, an IP header pointer, a transport header pointer and a configuration header pointer.

In the embodiment of the invention, each of said configuration objects includes elements selected from the group consisting of: a sequence number, a pointer to a previous configuration, and a pointer to a configuration binary blob.

According to one more aspect of the invention there is provided a computer readable medium, comprising a computer code instructions stored thereon, which, when executed by a computer, perform the methods of the present invention.

Thus, an improved management of firewall configurations is provided, which ensures correct association of packets with firewall configurations and the processing of packets based on the associated firewall configuration.

These and other features and objects of the invention will be more fully understood from the following detailed description of the preferred embodiments which should be read in light of the accompanying drawings.

BRIEF DESCRIPTION OF THE DRAWINGS

The embodiment of the invention will now be described, by way of example, with reference to the accompanying drawings in which.

DETAILED DESCRIPTION OF THE EMBODIMENTS OF THE INVENTION

Figure 1A:
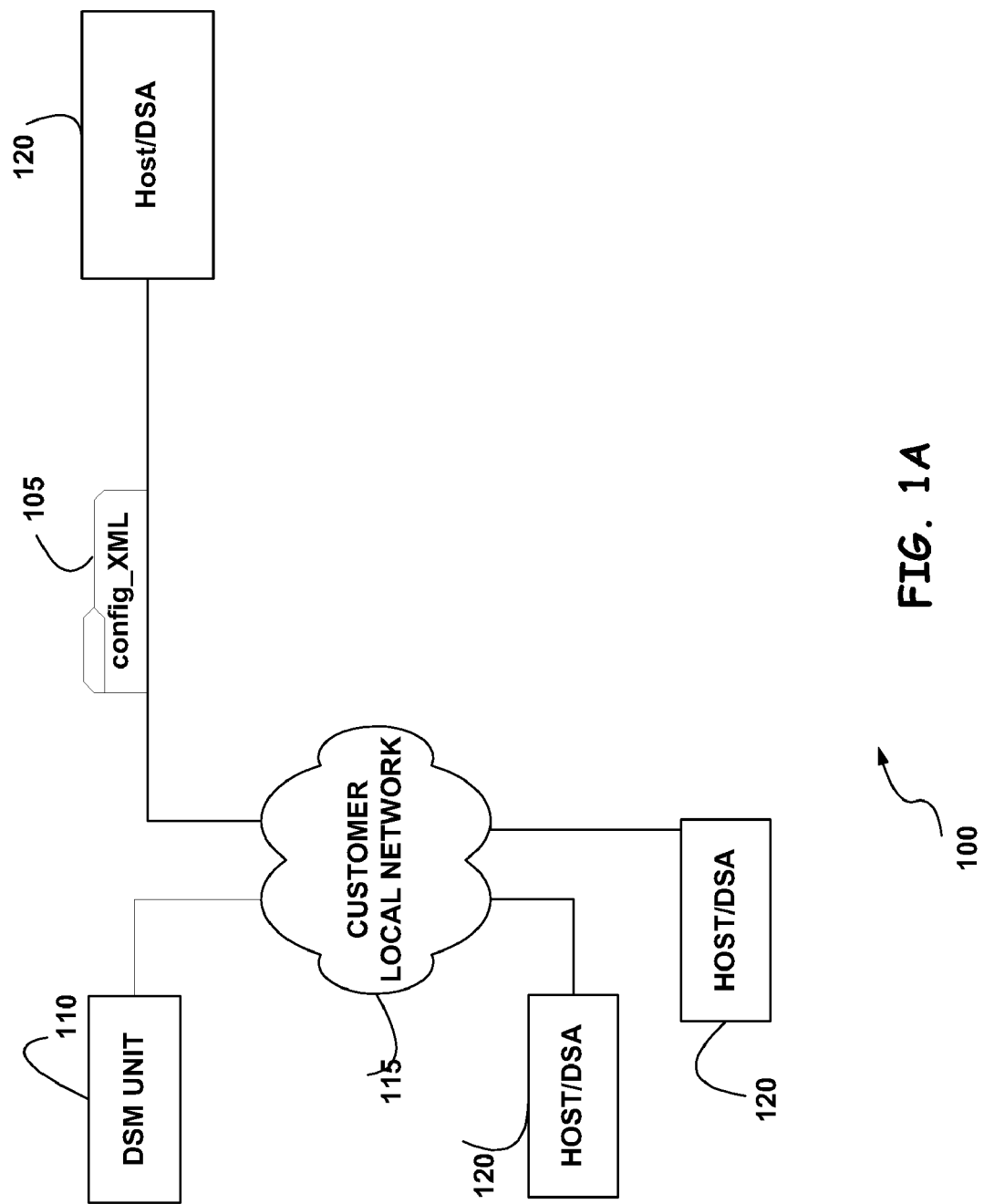
FIG. 1A illustrates a software security architecture of a HIPS according to an embodiment of the invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 6, in particular, the method and system of the embodiment of the present invention are disclosed.

The present invention is related to the management of multiple firewall configurations coexisting in a host over a same period of time. One form of software security architecture of HIPS of the embodiment of the present invention is shown in FIG. 1A. The HIPS includes three main components, namely "Labs" (not shown in FIG. 1A), a Deep Security Manager (DSM) unit 110, and a Deep Security Agent (or Agent) 125 running on each of the Host/DSA 120.

The "Labs" is the run server (not shown) where IPS Filters and Detection Rules and Expressions are defined. The DSM unit 110 is the server portion that runs within the enterprise to communicate to the Labs to receive updates and provides a central administration capability to the system by running the Recommendation Engine, querying the Agents, and by distributing security configuration to the Agents 125. The Agent 125 is the software that performs the HIPS on the host.

As mentioned above, the Deep Security software is composed of a Deep Security Manager (DSM) and Deep Security Agent (DSA). DSM 110 and DSA-enabled host (Host/DSA) 120 communicate over a link or connection such as the customer local network 115. The DSM 110 manages the configuration of multiple DSA's and sends the firewall configurations to the Agent 125 running on the Host. The configuration received from the DSM 110 is in an XML format (config_XML 105).

Figure 1B:
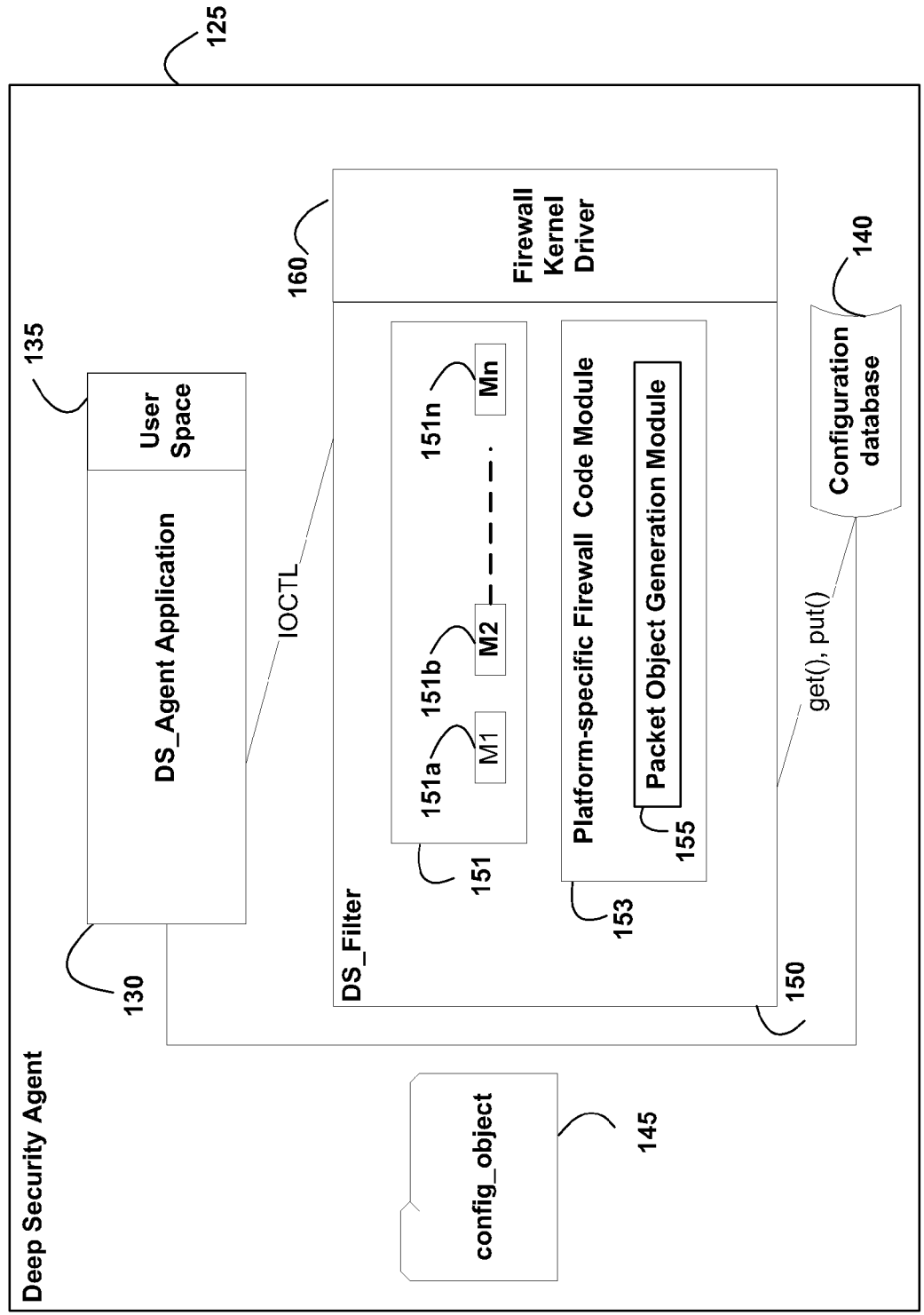
FIG. 1B illustrates the main components of a DSA according to an embodiment of the invention.

A shown in FIG. 1B, the DSA 125 is further divided into a DS_agent component, also referred to as the DS_Agent application 130, and a DS_filter 150. The DS_agent Application 130 runs at a user space level 135 while the DS_filter 150 runs at the firewall kernel driver level 160. The DS_Agent application 130 and the DS_filter 150 communicate via device IOCTL (Input/Output Control) calls. The firewall kernel driver 160 also includes a configuration database 140 for holding and managing the configurations to be used by processing modules 151a-151n of the firewall 160. The configurations in question, include all firewall 160 tunable parameters like firewall rules, deep packet inspection (e.g., payload) filters, TCP (Transport Control Protocol) timeouts, etc.

The DS_agent 130 compiles the XML configuration (config_XML 105) into a binary structure or blob and uses an IOCTL call to set the configuration in the configuration database 140 of the firewall kernel driver 160. The configuration is set in the configuration database 140 in the form of a configuration object or config_object 145 sent by the DS_agent application 130 to the configuration database 140. The config_object 145 is sent down to the configuration database 140 in full each time any configuration change is made at the DSM unit 110. In one embodiment, The configuration database 140 is provided with two sets of API (Application Program Interface), one for the DS_agent application 130 and one for the firewall kernel driver 160.

The main function of the DS_filter 150 is to filter packets, i.e. to decide if packets are to be allowed through or dropped in case of malicious traffic. A platform-specific code module 153 is provided to interface with a network packet buffering system of the host 120 such as NDIS (Network Driver Interface Specification) buffer on a windows-based platform or SKB (socket buffer) on linux-based platform. Network Operating Systems (NOS) such as Windows, Linux, HPUX and AIX have generally their own representation of packets. In one embodiment, the platform-specific code module 153 uses a common code to manipulate packet data irrelevant of the host NOS. The platform-specific code module 153 includes a packet object generation module 155 which generates a packet object. The packet object is a common representation of a packet data and includes, as part of the data structure of the packet object, pointers to platform specific packet data (NDIS buffers, skb on Linux, etc) and to the packet headers and lengths. The content of the packet object and its use in the present invention will be described with reference to FIGS. 3 and 5.

The platform-specific code module 153 parses the platform-specific packet data, and generates pointers as well as lengths of the headers and data sections. It requests the config_object 145 from the configuration database 140 and allows packet to pass if one is not available. The platform-specific code module 153 performs additional functions which are needed to work with different NOS. On Linux, for example, the platform-specific code module 153 is also responsible for updating local ARP (Address Resolution Protocol) cache if the packet is an ARP packet and for allocating and initializing the packet object. Additional functions of the platform-specific code module 153 includes resource cleanup, packet return to the network or IP stack, network adapter localization and handling of asynchronous injects when a connection is forced to close because of time-out.

As also shown in FIG. 1B, a deep security packet and payload inspection firewall 151 is divided into discrete steps implemented in firewall processing modules 151a . . . 151n (also labeled as M1 to Mn). The list of modules is static and not configurable, but how these modules behave is configured by the DSM unit 110 and the DSA 125 through fields in the configuration.

In one embodiment, seven processing modules 151a . . . 151n are provided to implement the deep security packet and payload inspection firewall 151. A first module 151a named a Verifier Module is provided for packet header validity check. A second module 151b or Microfilter Module is provided for prefiltering operation. The Microfilter prefilters which ports are allowed or must be bypassed. A third module (not shown) holds a Blacklist of IP addresses that are not allowed to pass through the system. Any packet coming from an address on the Blacklist will be dropped. This Blacklist is managed by the DSA 125. IP Fragmentation and Reassembly Modules (not shown) are also provided for splitting IP packets into multiple fragments according to the host or local network characteristics and for reassembly in their original format. A Packet Filtering Module (not shown) is provided to perform traditional firewall function such as IP address and TCP port number verification. A seventh module 151n is a Payload Inspection Module which performs deep packet inspection such as TCP/UDP content inspection.

The platform-specific code module 153 iterates over the firewall processing modules 151a . . . 151n letting them decide what to do with the packet. Each of firewall processing module 151a . . . 151n tests one aspect of the packet according to its function and as defined in the configuration of the firewall. At the end of the processing, it can specify if the packet is to be dropped, passed to the next module, or accelerated through the system.

As stated above, one objective of the present invention is to manage multiple firewall configurations coexisting within the HIPS in the same period of time. Diagram 200 of FIG. 2 of the present invention shows that the configuration database 140 stores all the configurations of the firewall in a linked list to maintain a list of all config_objects 145 allocated and not freed. By maintaining such a list, the configuration database 140 ensures that every config_objects 145 assigned to a packet arriving at the host/DSA 120 is kept in storage until the packet is completely processed by the deep security packet and payload inspection firewall 151. In this embodiment, the configuration database 140 keeps track of the most recent configuration and assigns the status of "current configuration" to it. All "get (configuration)" requests (shown in FIG. 1B) will get the current config_object 145a. When a new firewall configuration is sent by the DS_Agent application 130 operating in the user space 135, the previously set current firewall configuration is automatically dereferenced and hold the status of previous firewall configuration stored as config_object 145b and the new one becomes the current firewall configuration stored as config_object 145a. The configuration database 140 will also keep config_object 145c if a packet assigned to it is still in transit in the firewall processing modules 151a . . . 151n because of delay in processing (asynchronous processing).

In meeting the objective mentioned above, a linkage and management thereof is provided between a packet arriving at the host/DSA 120 and a firewall configuration to be applied to the packet.

Figure 3:
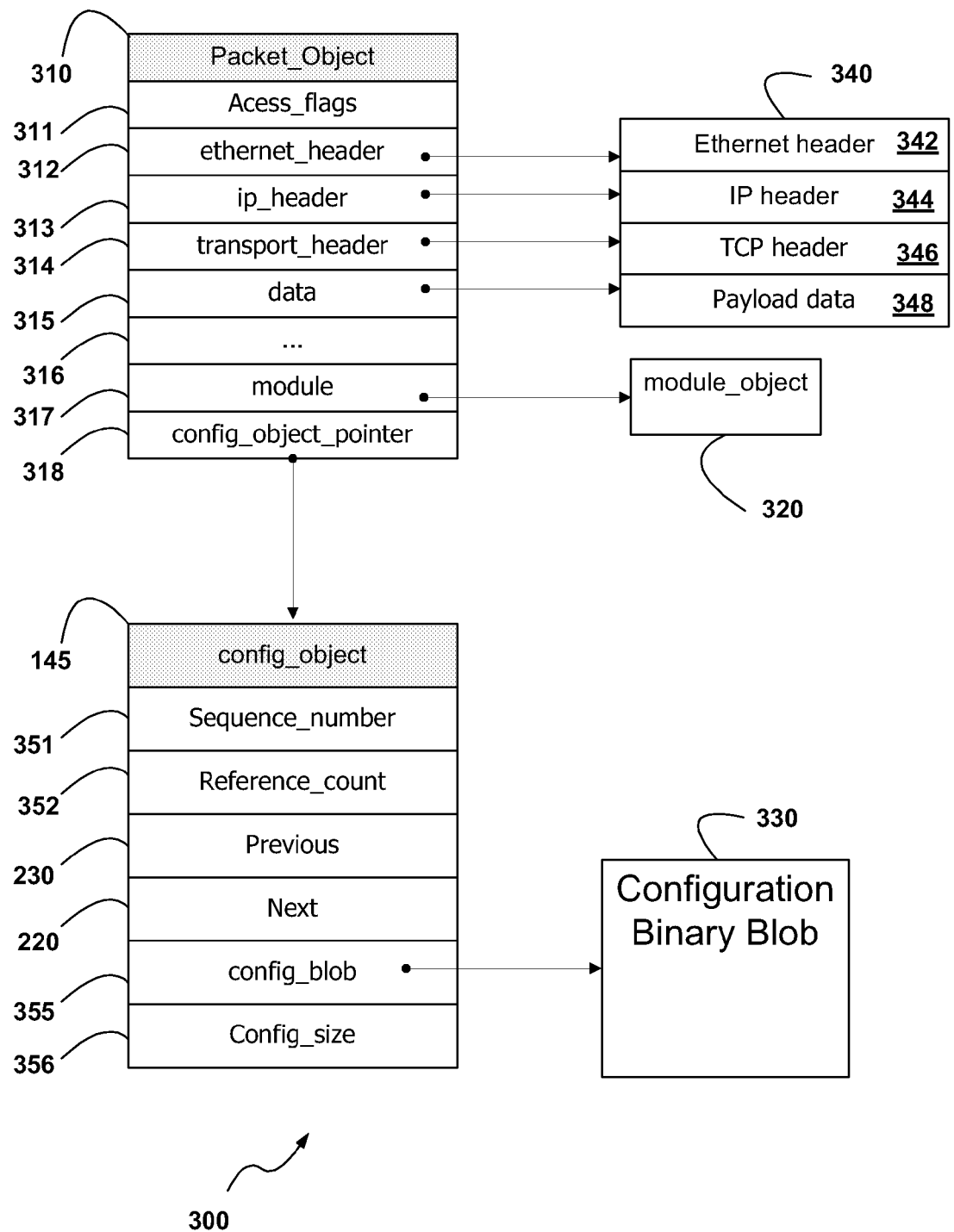
FIG. 3 shows a diagram illustrating a relationship between packet objects and configuration objects.

Diagram 300 of FIG. 3 illustrates such a linkage by showing a relationship between a packet 315 and its associated configuration binary blob 330. As shown in FIG. 3, a packet object 310 is associated with a packet 340 to represent it in the host/DSA 120 (shown in FIG. 1A). The packet 340 is represented by the NOS as a binary blob and contains network protocol headers (Ethernet, IP, TCP, etc) and payload. It has a distinct length and can be parsed knowing the protocol standards. The packet object 310 is used to pre-parse the headers, provide easy access to the packet headers, and store additional states and information about the packet 340. Some of the items that are maintained by the packet object 310 are as follows:

access flags 311 which inform the firewall processing modules 151a-151n which parts of the packet are safe to access, and which can be written to;
  pointers 312-315 to protocol headers and payload data (elements 342-348 of the packet 340) and their lengths which speed up the access, by the firewall processing modules 151a-151n, to the binary data contained within the packet 340 without repeating the parsing process in each of the processing modules 151-151n;
  pointer 317 to the current firewall processing module (module_object 320), which is used when traversing through all the firewall processing modules 151a-151n; and
  counters, statistics, and profiling information identified as element 116 of packet_object 310 are also kept here and used within the DSA 125.

In the embodiment of the invention, a new pointer named configuration object pointer or config_object_pointer 318 is added to the packet object 310 which references or points to the config_object 145 that defines how the processing modules 151a-151n will treat the packet 340 as it traverses through the firewall processing modules 151a-151n.

Figure 2:
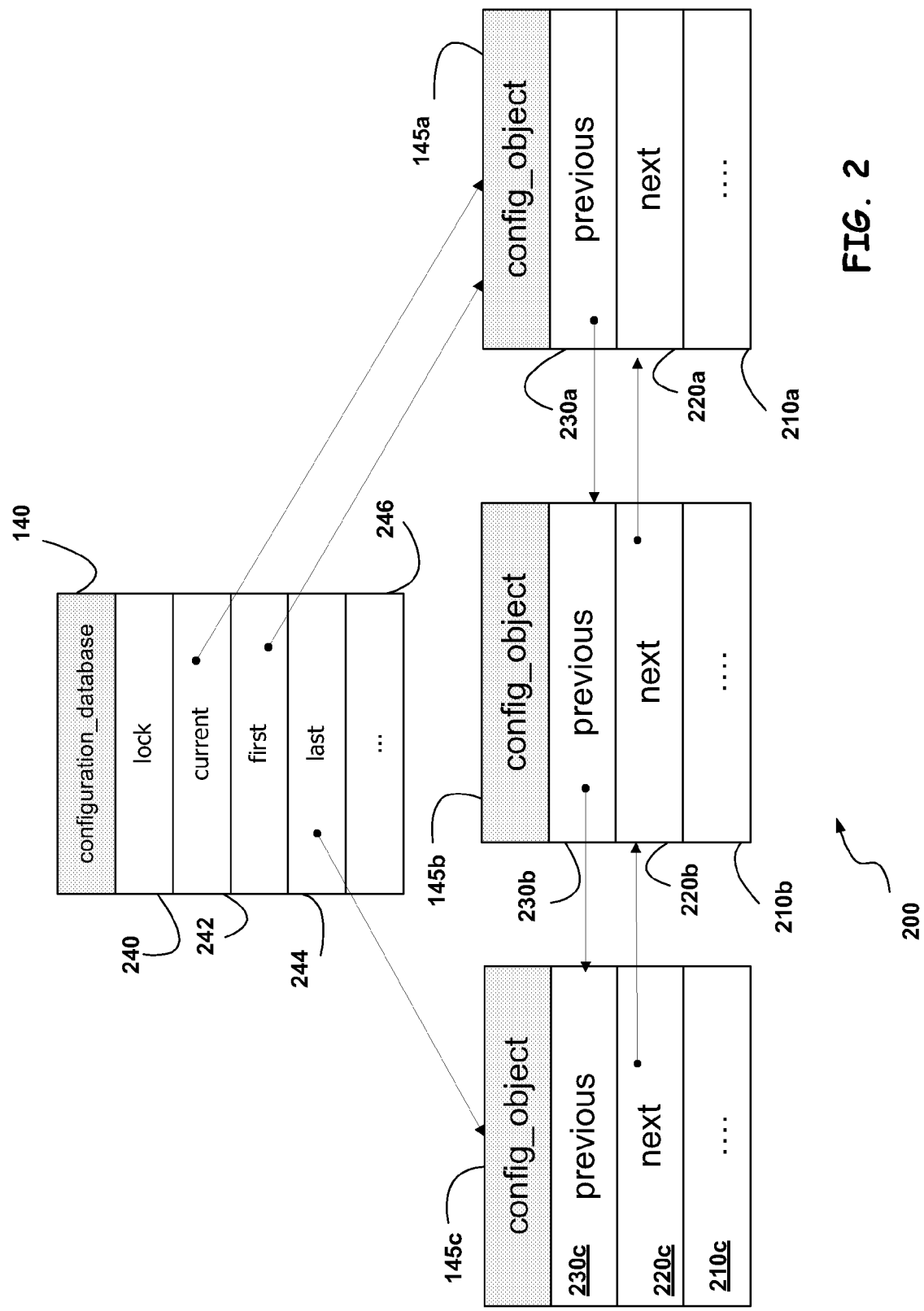
FIG. 2 shows a diagram illustrating a relationship between configuration database and configuration objects of FIG. 1B.

Some of the items that are maintained by the config_object 145 are shown in FIG. 3 and include:

sequence number 351 which is uniquely assigned by the configuration database 140 to each config_object 145;
  reference count 352 which identifies the number of packets that are using this configuration;
  previous 230 and next 220 pointers, which are used to point to the previous config_objects 145c and to the next config_object 145a, respectively and as shown in FIG. 2; and
  a pointer 355 to the configuration binary blob 330 itself and the config_size 356 element for holding the size of the configuration binary blob 330.

The reference count 352 is always initialized to a current-value reference count when the configuration is created in the configuration database 140. The current-value reference count refers to a value of the reference count 352 which confers to the config_object 345 (or its associated firewall configuration) the status of current config_object (or current firewall configuration). In one embodiment, the current-value is set to one. Alternatively, it can be any value that represents the firewall configuration as the current firewall configuration.

Each new packet_object 310 that is associated with a given config_object 145 increments the reference count. When that packet_object 310 has exited the firewall processing modules 151a-151n, the reference count 352 of the config_object 145 is decremented. Should the reference count 352 decrements to zero or any other value that represents the fact that the config_object 145 is no more the current one and no packet in the host 120 is assigned to it, the config_object 145 and its corresponding configuration binary blob 330 are deleted and removed from the configuration database 140.

By providing a config_object_pointer 318 in the packet_object 310 referencing the config_object 145, the packet 340 is assured to be processed by the various firewall processing modules 151a-151n according to the configuration binary blob 330 assigned to the packet 340 when it entered the host 120.

The config_object 145 and the config_object_pointer 318 are introduced to solve the problem of maintaining multiple configurations of the firewall present in the host 120 at the same time. This is required as packets can be processed by processing modules 151a-151n asynchronously and over long periods of time. In effect, some packets will traverse the firewall processing modules 151a-151n synchronously from the IP-stack.

Other packets may be queued up by various firewall processing modules 151a-151n waiting for some condition to be reached; these will be handled asynchronously.

While a packet 340 is queued up, the default firewall configuration in the configuration database 140 may change, but the association between a specific configuration binary blob 330 and a specific packet 340 will never change. Therefore, according to the principle of the present invention, the configuration blob 330 associated with the packet 340 is kept until the packet 340 is dropped or returned to the IP-stack. In such a case, it is possible that some packets 340 in the host 120 are being processed under different firewall configurations than others.

In this embodiment, when multiple configurations of the firewall co-exist in the host 120, each packet 340 will be processed according to its originally assigned firewall configuration.

Figure 4:
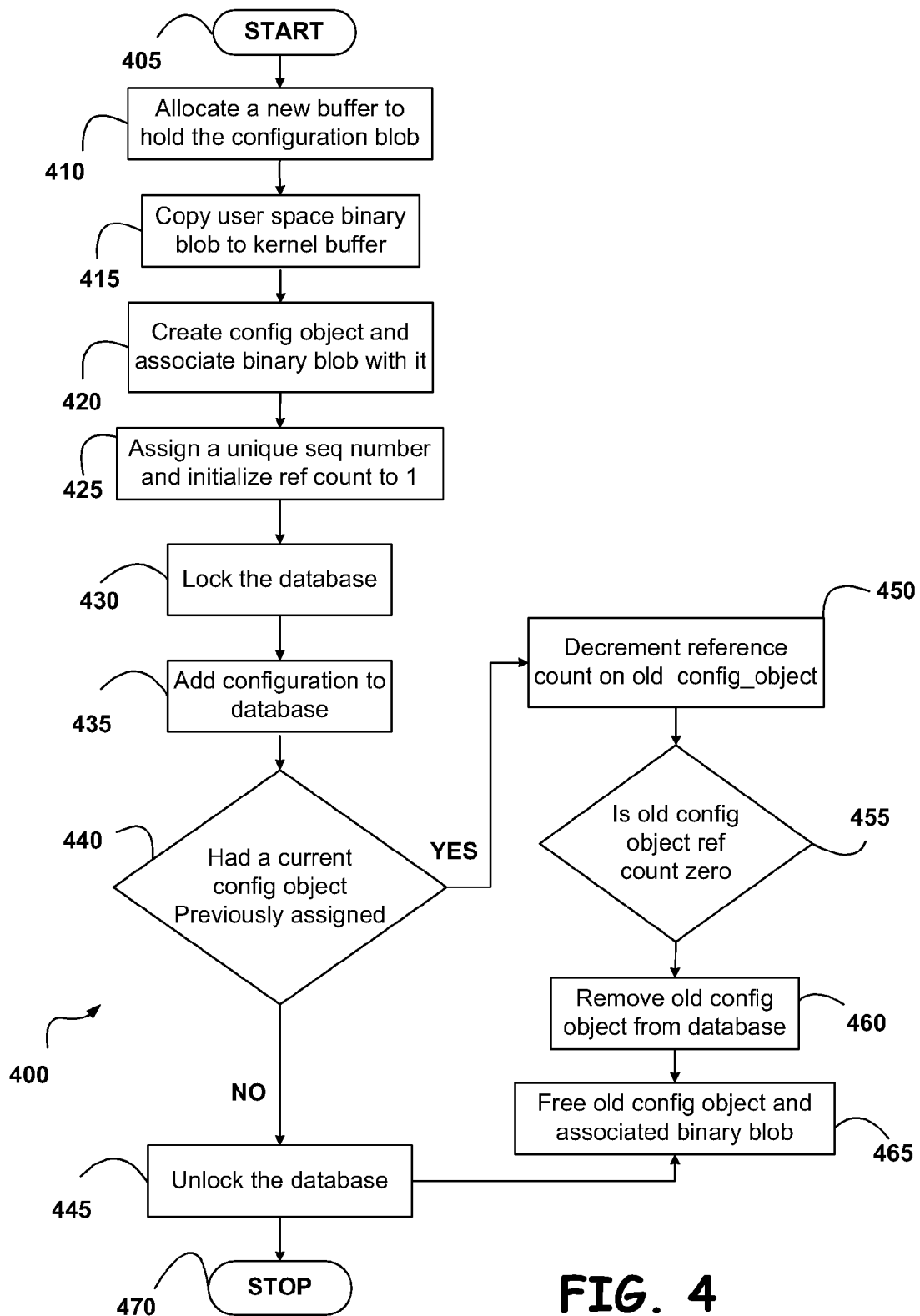
FIG. 4 shows a flowchart for the management of configurations of the firewall according to the method of the embodiment of the invention.

FIG. 4 illustrates the management of configurations of the firewall after they are released and sent to the DSA 125. The API of the configuration database 140 to the Deep Security Agent application 130 described above allows for the configuration to be set or cleared in the configuration database 140. In operation, upon start 405, when a first configuration is received, a new buffer is allocated in the user space 135 to hold the binary configuration blob 330 at step 410. At step 415, a configuration memory (not shown) in the user space is copied to an allocated buffer in the kernel space and at step 420 a config_object 145 is created to track the configuration and is associated with the binary configuration blob 330. At step 425, a new unique sequence number 351 is assigned to the config object 145. In one embodiment, any newly released firewall configuration is set as the current configuration, which is associated to any new packet entering the host 120. The reference count 352 of the config_object 145 thus created is therefore initialized to one. This is also performed at step 425. In this embodiment, a reference count 352 having a value equal to one represents a current configuration. Alternatively, a different value of the reference count can be used to represent a firewall configuration as current.

To prevent race condition to occur which can crash the configuration database 140, a locking is performed at step 430. The lock prevents other concurrent threads, that need to access the configuration database 140 before an add operation of step 435 is complete, from seeing the configuration database 140 in an inconsistent state. At step 435, the config_object 145 is added to the configuration database 140 and a check is made, at step 440, to determine whether an old config_object with a current status is already present in the status. If no current config_object is present in the configuration database 140 (exit NO of step 440), the configuration database 140 is unlocked at step 445 and the method ends and exits at step 470. If however a current config_object 145 is already in the configuration database 140 (exit YES of step 440), that current config_object 145 is dereferenced at step 450 by decrementing its reference count 352. If the count is decremented to zero (step 455), this means that no packet object 310 is currently assigned to that config_object 145, the dereferenced config_object 145 can therefore be cleared from the configuration database 140 (step 460). All the resources allocated to the config_object 145 and its associated configuration binary blob 330 are freed (step 465). At step 440, the configuration database is unlocked to allow further access and at step 470 the method ends.

Figure 5:
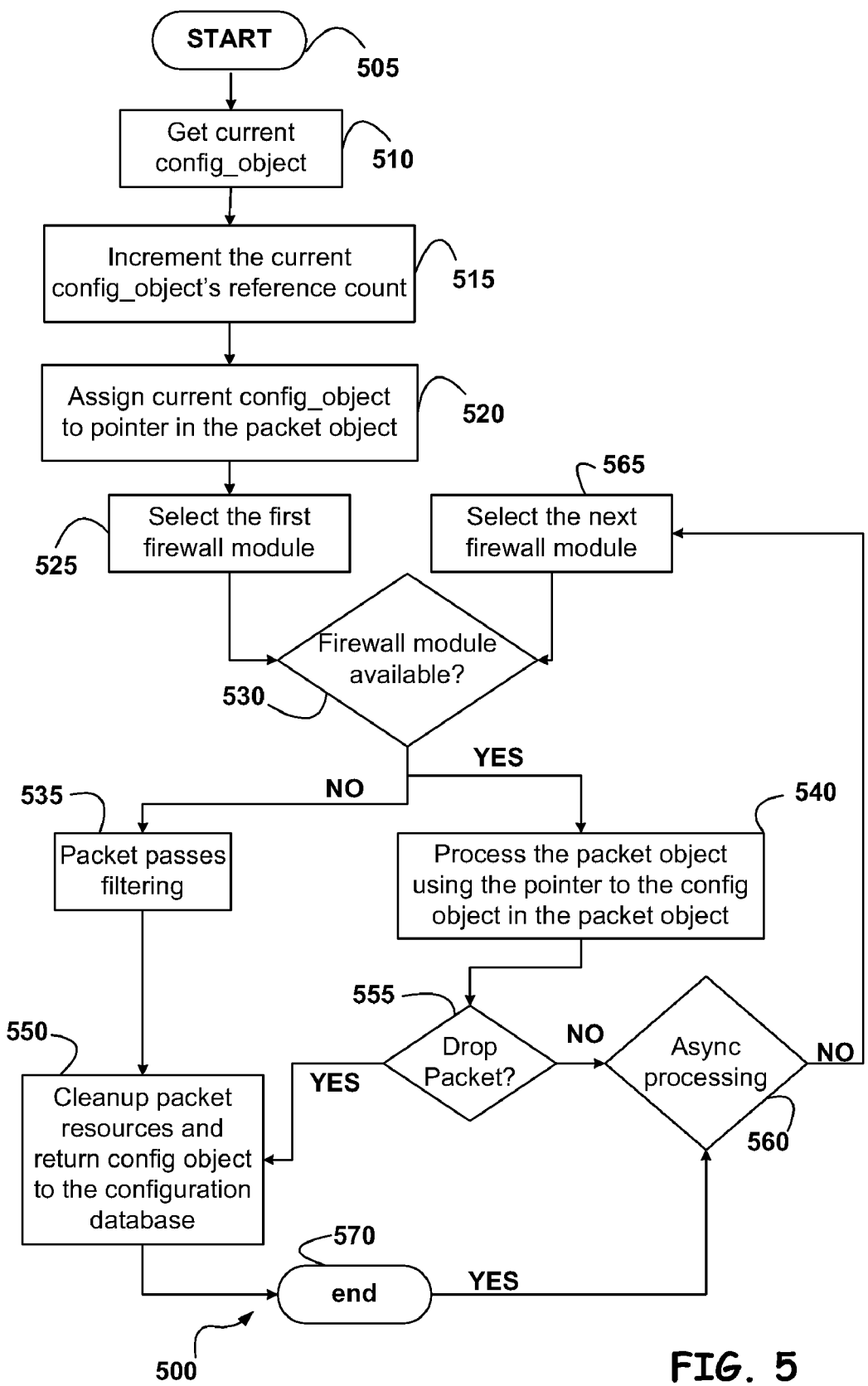
FIG. 5 shows a diagram illustrating the processing of packets as they enter a Host according to the present invention.

FIG. 5 illustrates the processing performed on the packets when they enter the DSA 125. As described above, the platform-specific code module 153 creates the packet_object 310 and uses the kernel facing API of the configuration database 140 to request a config_object 145 (step 510) through the "get (current configuration)" API function. Obtaining the config_object 145 from the configuration database 140 increments a reference count 352, causing the config_object 145 to remain in the database 140 as long as the packet is in the DSA 125.

At step 515 the reference count 352 of the config_object 145 is incremented as a result of the config_object 145 being assigned to a packet_object 310. At step 520, the packet_object 310 stores the reference of the config_object 145 in its config_object_pointer 318.

At step 525, the first module 151a is selected for processing the packet_object 310, and at step 530 a check is made to determine whether a subsequent processing module 151b-151n is available to process the packet_object 310. If no processing module is available, the packet 340 associated with the packet_object 310 is considered to have passed the filtering operation (step 535), and at step 550 the resources held for the packet_object 310 are released and the reference count 352 of its assigned config_object 145 is decremented by the platform-specific code module 153 issuing a "put (configuration)" API function to the configuration database 140.

If one of processing modules 151a-151n is still available after the test, at step 530, it processes the packet_object 310 at step 540 and makes a determination as to whether its associated packet 340 needs to be dropped (step 555) or passed on to the next available processing module 151b-151n (step 565) if the packet 340 does not require an asynchronous processing (step 560). If the packet_object 310 needs to be dropped, step 550 is evoked as shown in the flowchart 500 before the flowchart ends at step 570. As also shown, the flowchart 500 exits at step 570 if the packet_object 310 requires an asynchronous processing (step 560) (the subsequent steps performed when an asynchronous processing is required are not shown here).

Figure 6:
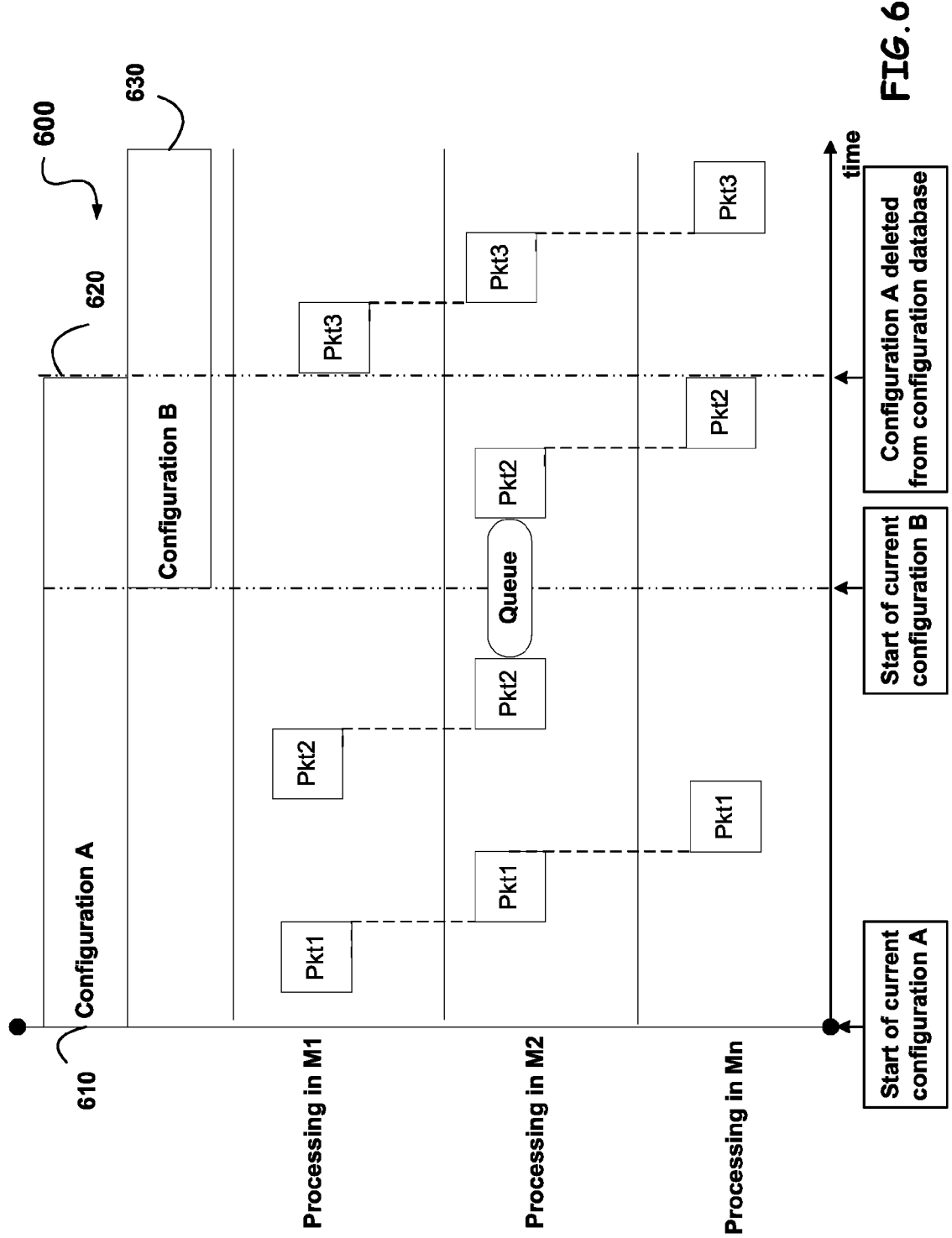
FIG. 6 shows a timeline diagram, illustrating relationship between packets and configurations over time.

FIG. 6 shows a timeline relationship between packets and configurations of the firewall over time, in particular, how packet processing influences config_objects 145 retention in the configuration database 140.

The configuration A (610) and configuration B (630) represent two configurations of the firewall sent down by the DS_agent application 130 at their respective start time: Start of current configuration A and Start of current configuration B shown in Diagram 600 of FIG. 6.

In the embodiment of the invention, any new packet_object 310 created at a time T, will have a corresponding current configuration assigned to it which will be used by all processing steps: for packet objects 1 and 2 (pkt1, pkt2) that is configuration A, and for packet object 3 (pkt3) it is configuration B.

The lower three horizontal regions (651*a*, 651*b* and 651*n*) represent, for exemplary purpose, the processing of a packet by three modules (M1, M2 and Mn respectively) within the DSA 125. A packet may only be processed by one module at one time, but it is possible for multiple packets to be processed in parallel. In the case of pkt1 and pkt3, the processing was done as one synchronous operation. That is, after processing pkt1 in M1, the pkt1 was processed by M2 through Mn without waiting for external events.

Packet 2 (pkt2), however, was queued up after being partially processed by M2. This can happen when processing cannot continue until an external event had occurred like looking up the SSL certificate for SSL encrypted packets. Although not shown, it is possible for module M2 to process other packets while Pkt2 is waiting for external events. In effect, during this time other packets can be processed fully or partially and new configuration can be set by the DS_agent application 130. As shown in FIG. 6, Configuration A is no longer the current configuration when the processing of pkt2 is resumed by module M2 since Configuration B has taken over as the current configuration. In the period 620, the two configurations (A and B) co-exist in the DSA 125. However, in the embodiment of the present invention, the config_object_pointer 318 (shown in FIG. 3) to configuration A is included in the pkt 2 object, so that processing can resume with the same configuration A. Once modules M2 through Mn finish processing the pkt2, and the packet is cleaned up, the configuration A is dereferenced in the configuration database 140. Since there are no more packets referencing configuration A and configuration A is not the current configuration anymore, the associated config_object 145 is released and configuration A is deleted from the configuration database 140.

Thus, an improved method and system for managing firewall configurations have been provided.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

The invention claimed is:

1. A method for managing configurations of a firewall at a computer, comprising:
   (a) providing a previous configuration object representing a first firewall configuration, and a current configuration object representing a second firewall configuration;
   (b) representing a first packet received at the computer with a first packet object and assigning said first packet object to said previous configuration object;
   (c) representing a second packet received at the computer with a second packet object and assigning said second packet object to said current configuration object;
   (d) processing, by a hardware processor, the first packet object by a plurality of firewall processing modules based on the previous configuration object assigned to said first packet object; and
   (e) processing, by the hardware processor, the second packet object by said plurality of firewall processing modules based on the current configuration object assigned to said second packet object, without waiting for completion of the processing of the first packet object.

2. The method of claim 1, further comprising deleting said previous configuration object from a configuration database when no more packet object assigned to said previous configuration object is present in the firewall processing modules.

3. The method of claim 1, further comprising providing a first configuration object pointer on said first packet object for referencing said previous configuration object, and providing a second configuration object pointer on said second packet object for referencing said current configuration object.

4. The method of claim 1, wherein
   the step (a) comprises providing first and second reference counts for the previous and current configuration objects respectively, for counting corresponding numbers of packet objects being currently processed by the firewall according to respective configuration objects.

5. The method of claim 1, wherein the previous and the current configuration objects are stored in a configuration database.

6. The method of claim 4, further comprising decrementing the first and second reference counts when the processing of the respective first and second packet objects by said plurality of firewall processing modules is completed.

7. The method of claim 4, further comprising:
   (f) initializing the second reference count to a current value; and
   (g) decrementing the first reference count of the previous configuration object once the second reference count of said current configuration object is initialized.

8. The method of claim 6, further comprising:
   (h) deleting said previous configuration object from said configuration database provided the first reference count of said previous configuration object is decremented to a minimal value.

9. The method of claim 1, wherein the step (b) further comprises providing a first configuration object pointer on said first packet object for referencing said previous configuration object.

10. The method of claim 1, wherein the steps (b) and (c) further comprise providing at least two pointers on each said first and second packet objects for referencing respective data sections and header sections of corresponding packets received at the computer and represented by said first and second packet objects respectively.

11. The method of claim 1, wherein said first and second firewall configurations are represented as respective configuration binary structures.

12. The method of claim 11, wherein the previous and current configuration objects include respective pointers to said respective configuration binary structures.

13. The method of claim 1, wherein said first and second packet objects include elements selected from the group consisting of: an Access flag, an Ethernet header pointer, an IP header pointer, a transport header pointer, and a configuration object pointer.

14. A system for managing multiple firewall configurations at a computer, comprising:

a hardware processor and a non-transitory computer readable storage medium having computer readable instructions stored thereon for execution by the hardware processor, causing the hardware processor to perform:
- (a) providing a previous configuration object representing a first firewall configuration, and a current configuration object representing a second firewall configuration;
- (b) representing a first packet received at the computer with a first packet object and assigning said first packet object to said previous configuration object;
- (c) representing a second packet received at the computer with a second packet object and assigning said second packet object to said current configuration object;
- (d) processing the first packet object by a plurality of firewall processing modules based on the previous configuration object assigned to said first packet object; and
- (e) processing the second packet object by said plurality of firewall processing modules based on the current configuration object assigned to said second packet object, without waiting for completion of the processing of the first packet object.

15. The system of claim 14, wherein each of said previous and current configuration objects includes a respective reference count initialized to a current-value reference count and used for tracking a number of respective packet objects assigned to said corresponding previous and current configuration objects.

16. The system of claim 14, wherein said first and second packet objects include respective configuration object pointers for respectively referencing said previous and current configuration objects.

17. The system of claim 14, wherein said first and second packet objects include elements selected from the group consisting of: an Access flag, an Ethernet header pointer, an IP header pointer, a transport header pointer, and a configuration object pointer.

18. The system of claim 14, wherein said previous and current configuration objects include elements selected from the group consisting of: a sequence number, a pointer to another configuration object, and a pointer to a configuration binary structure.

19. A non-transitory computer readable medium, comprising a computer code instructions stored thereon, which, when executed by a computer, perform:
- (a) providing a previous configuration object representing a first firewall configuration, and a current configuration object representing a second firewall configuration;
- (b) representing a first packet received at the computer with a first packet object and assigning said first packet object to said previous configuration object;
- (c) representing a second packet received at the computer with a second packet object and assigning said second packet object to said current configuration object;
- (d) processing the first packet object by a plurality of firewall processing modules based on the previous configuration object assigned to said first packet object; and
- (e) processing the second packet object by said plurality of firewall processing modules based on the current configuration object assigned to said second packet object, without waiting for completion of the processing of the first packet object.

20. The system of claim 14, wherein said previous and current configuration objects include elements selected from the group consisting of: a sequence number, a pointer to another configuration object, and a pointer to a configuration binary structure.

* * * * *

UNITED STATES PATENT AND TRADEMARK OFFICE
CERTIFICATE OF CORRECTION

| | |
|---|---|
| PATENT NO. | : 8,132,248 B2 |
| APPLICATION NO. | : 12/139492 |
| DATED | : March 6, 2012 |
| INVENTOR(S) | : Bart Trojanowski |

It is certified that error appears in the above-identified patent and that said Letters Patent is hereby corrected as shown below:

col. 12, line 9, "computer readable medium" should read --computer readable storage medium--

Signed and Sealed this
Twenty-fourth Day of April, 2012

David J. Kappos
*Director of the United States Patent and Trademark Office*